Figure 1:
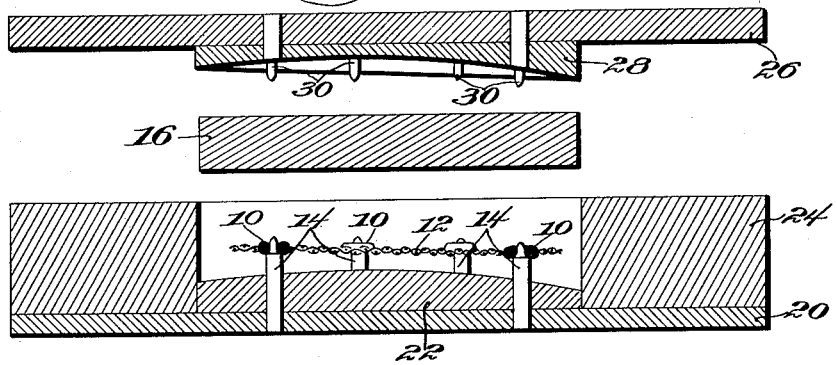

Sept. 10, 1929.  C. ROBERTS  1,727,412

TREAD MEMBER FOR BOOTS AND SHOES AND METHOD OF MAKING THE SAME

Filed May 1, 1925

Patented Sept. 10, 1929.

1,727,412

UNITED STATES PATENT OFFICE.

CLIFFORD ROBERTS, OF REIGATE, ENGLAND, ASSIGNOR TO UNITED SHOE MACHINERY CORPORATION, OF PATERSON, NEW JERSEY, A CORPORATION OF NEW JERSEY.

TREAD MEMBER FOR BOOTS AND SHOES AND METHOD OF MAKING THE SAME.

Application filed May 1, 1925. Serial No. 27,124.

The present invention relates to the manufacture of resilient tread members for boots and shoes and more particularly to the manufacture of resilient heels having embedded washers or equivalent nail retaining devices.

In the production of the usual type of rubber heel, a series of metallic washers are first mounted on suitably located mold pins. Thereafter a rubber blank or biscuit of the proper dimensions is superimposed over the mold pins, the top portion of the mold applied, and the rubber blank subjected to vulcanizing heat and pressure. The temperature within the mold causes the rubber biscuit to flow about the mold pins and washers retained thereon. At the completion of the vulcanizing operation, the rubber blank has assumed a completed heel shape with the metal washers embedded at predetermined points within the body. The mold pins not only serve to locate the washers during the vulcanizing operation but in addition form guide openings in the finished heel extending from the tread surface and serving to locate the attaching nails with respect to the embedded washers. Although various attempts have been made to locate these washers automatically, these devices as a rule have not been satisfactory and in the majority of instances the washers are placed upon the mold pins by hand. This is obviously a laborious operation and adds substantially to the cost of the finished product. This item in fact constitutes a substantial charge against heels intended to sell on a competitive basis.

One object of the present invention is to improve the method of manufacturing rubber heels with embedded washers or equivalent nail holding devices in such a manner that the production of heels of this type in quantity is greatly facilitated and the cost substantially reduced.

According to the present invention, the nail holding washers are preliminarily mounted in a carrier which insures the arrangement of the washers in register with the mold pins. This carrier conforms to the general outline of the finished heel with the washers secured thereto in the same spaced relation which they assume in the finished heel. By inserting the carrier with the attached washers within a mold, the washers may be simultaneously mounted upon the mold pin in about the time required to ordinarily locate a single washer by hand. According to the most approved method yet devised, a carrier of fabric is loaded with a series of eyelets which are clinched to retain them in position in the fabric. The fabric may be stiffened through an immersion in a suitable stiffening solution, such as a starch compound, in order to facilitate handling and placing of the washers on the mold pins. The insertion of the washers or eyelets within the fabric carrier may be easily accomplished by an eyeleting machine which inserts and clinches a plurality of eyelets at one time. After the location of the carrier and attached washers on the mold pins, a rubber blank of the usual form is superimposed over the carrier and the upper portion of the mold applied. Upon the application of heat and pressure, the blank is forced downwardly toward the bottom of the mold, carrying the relatively fragile fabric carrier with it. The carrier is easily parted from the attached washers, leaving the latter in place on the mold pins. The major portion of the carrier remains at the bottom portion of the mold and is embedded in the completed heel member. In the usual practice, the molds are arranged with the bottom portion of the mold designed to form the tread face of the heel. According to the present invention, however, the heel is molded in a reverse position with the bottom portion of the mold forming the attaching face of the heel, the mold pins extending upwardly from the bottom portion of the mold and forming openings in the finished heel which extend from the attaching face inwardly toward the embedded washers. The location of the washers within the heel may, if so desired, be indicated by pins or suitably formed projections located on the complementary portion of the mold and serving to form openings, depressions, or projections, on the tread face of the heel in substantial register with the embedded washers. The finished heel produced in this manner has embedded washers in the form of eyelets and is in addition roughened throughout the attaching face, due to the fabric carrier embedded therein. Not only does this method secure a better bond between the washers and the heel but the roughening of the attaching face, due to the embedded fabric, promotes the bond between the rubber heel and shoe heel in the event that the holding effect of the nails is augmented through the use of cement.

Figure 2:
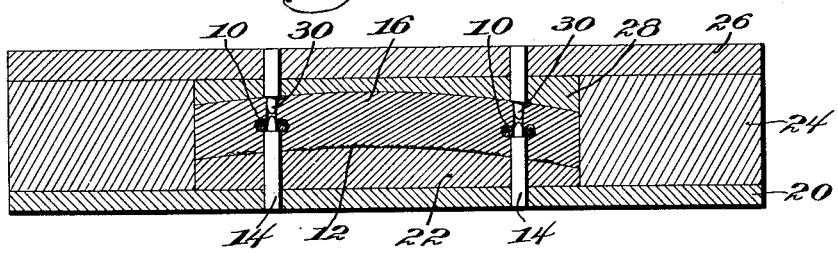
Figure 3:
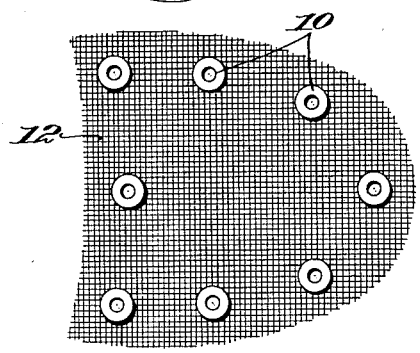

In the accompanying drawings illustrating the preferred form of the invention, Fig. 1 represents a section in elevation of the separated parts of a mold with the carrier and washers located on the mold pins and a rubber blank superimposed thereabout preliminary to the vulcanizing operation; Fig. 2 represents a section of the mold at the completion of the vulcanizing operation with the rubber heel body surrounding the washers and the fabric carrier embedded in the attaching face of the heel at the bottom of the mold; and Fig. 3 is a detail illustrating the fabric carrier with the washers or eyelets attached thereto in predetermined location.

According to the present invention, as carried out in the best manner now known, a series of eyelets 10 are inserted in a fabric carrier 12 having the general outline and contour of a finished heel. The location of the eyelets in the carrier corresponds to the location of the mold pins and the desired location of the washers in the finished heel. The automatic insertion and clinching of the eyelets in the carrier is readily accomplished through the usual form of eyeleting machine, which is adapted to insert the eyelets automatically, making the operation exceedingly simple and inexpensive. The eyelets are clinched sufficiently to permit handling of the carrier without dislodging the eyelets and it may be desirable, although not essential, to provide some means for stiffening the fabric carrier in order to facilitate handling and positioning of the eyelets on the mold pins. To this end, a fabric, such as cheesecloth, loosely woven canvas, or similar material, may be provided and temporarily stiffened through the employment of a small amount of starch solution or similar stiffening compound. These carriers with the embedded eyelets may be made in any quantities desired in advance of their use in the heels and stacked or piled preparatory to insertion in the molds. After completion of the carriers, it is a relatively simple matter to insert the carriers with the attached load of washers or eyelets in the heel cavities with the washers mounted on the mold pins. This is indicated clearly in Fig. 1 of the drawings, in which the carrier 12 is inserted in the mold cavity with the eyelets 10 positioned upon the mold pins 14. After the washers have been preliminarily located, a rubber blank or biscuit 16 of the usual form is superimposed thereover in the mold cavity and the operation of vulcanizing the heel is carried out in the usual manner. As indicated more particularly in Figs. 1 and 2 of the drawings, the form of mold best adapted for production of the new heel comprises a lower portion 20 having a convex projection 22, an intermediate cavity portion 24, and an upper mold plate 26 having a concave projection 28. The convex projection 22 attached to the lower portion of the mold forms the attaching face of the heel and the concave projection forms the tread face. In order to provide means for indicating the location of the embedded washers, a series of short pins 30 extend from the concave projection 28 and serve to form guide openings extending inwardly from the tread face of the heel toward the embedded eyelet 10. At the completion of the heel, as indicated in Fig. 2, the fabric carrier 12 is torn from the washers or eyelets 10 and forced toward the bottom of the mold. In this position, the fabric, as indicated in Fig. 2, is embedded in the attaching face of the heel.

Although the present invention is described particularly in connection with the production of curved heels, nevertheless it is equally well adapted to the production of flat heels. In the case of flat heels, the upper and lower faces of the mold cavity are plane surfaces and the washers are mounted on mold pins extending upwardly from the bottom of the mold in a manner identical with that illustrated.

Although the method actually illustrated contemplates the employment of a fabric carrier for the retention of the washers or eyelets, it must be evident that carriers of other materials might be equally well adapted for the purpose. As an example, a carrier of chemically treated paper or fabric might be utilized for temporarily holding the washers and subsequently destroyed through the heat of the vulcanizing operation. On the other hand, the stiffening material might be buckram or a similarly treated and sized fabric designed to hold its shape during the initial handling and to become soft and flexible under the vulcanizing heat in order not to interfere with the resilience of the material. Furthermore, the use of a conventional form of eyelet is merely illustrated because of its adaptability for the purpose, this form of eyelet being easily inserted and clinched in the carrier, fitting the mold pins, forming a good bond with the heel during the vulcanizing operation, and serving to satisfactorily retain the attaching nails. In other words, the conventional form of eyelet is admirably adapted for preliminary attachment in the carrier and thereafter is the full equivalent of the conventional form of nail holding washer and in effect is a washer of an approved type.

I claim—

1. A method of manufacturing rubber heels which consists in mounting a series of nail holding washers according to a predetermined arrangement in a carrier, positioning the carrier in a heel mold with the attached washers in register with the mold pins, superimposing a rubber blank over the carrier and pins, and subjecting the assembly to heat and pressure in a manner to force the carrier from the washers downwardly toward the bottom of the mold and mold the rubber about the washers.

2. That step in the manufacture of rubber heels having embedded nail holding washers which comprises mounting the washers in a predetermined arrangement in a relatively fragile carrier, and thereafter positioning the carrier with the attached washers in a mold cavity with the washers in register with the mold pins and with a rubber blank superimposed thereon.

3. A method of manufacturing rubber heels which consists in mounting a series of washers in predetermined arrangement in a carrier of sheet-like form, positioning the carrier with the attached washers in a heel mold designed to form the heel with the attaching face at the bottom of the mold, inserting a rubber blank, and subjecting the whole to heat and pressure to force the carrier to the bottom of the mold cavity and mold the rubber blank about the washers.

4. A method of manufacturing rubber heels which comprises inserting and clinching a plurality of eyelets in a carrier of sheetlike form, mounting the carrier in a heel mold with the eyelets in register with the mold pins, superimposing thereover a rubber blank, and subjecting the whole to heat and pressure in a manner to mold the blank about the eyelets and cause the latter to be embedded therein.

5. A method of manufacturing rubber heels which comprises inserting and clinching a series of eyelets arranged in predetermined order in a fabric carrier, inserting the carrier with the attached eyelets in a heel mold with the eyelets in register with the mold pins, superimposing thereover a blank of rubber, and subjecting the assembly to heat and pressure to part the carrier from the eyelets and mold the rubber blank about the eyelets.

6. A method of manufacturing rubber heels which comprises inserting and clinching a series of eyelets in a predetermined arrangement in a fabric carrier of heel shape, positioning the carrier in a heel mold with the eyelets supported by the mold pins, superimposing thereover a blank of rubber, and subjecting the assembly to heat and pressure to force the fabric carrier away from the eyelets and mold the rubber in heel form about the eyelets with the fabric carrier embedded in the attaching face.

7. A method of manufacturing rubber heels which comprises loading a chemically treated fabric carrier of heel shaped outline with a series of nail retaining washers arranged in predetermined order, assembling the carrier in a mold cavity with the washers supported upon mold pins, superimposing a blank of rubber above the carrier, and subjecting the carrier and blank to vulcanizing heat and pressure in a manner to partially or wholly disintegrate the carrier and leave the washers suspended on the mold pins.

8. A tread member element for boots and shoes comprising a sheet of fabric having the general outline of the tread member and treated to initially stiffen the fabric to permit it to become relatively soft and flexible when subjected to heat, and a plurality of washers mounted in predetermined relation in the fabric carrier.

In testimony whereof I have signed my name to this specification.

CLIFFORD ROBERTS.